Dec. 14, 1971        M. R. HOLSTE        3,626,694
CENTRIFUGAL FLOW GAS TURBINE
Filed May 18, 1970        4 Sheets-Sheet 2
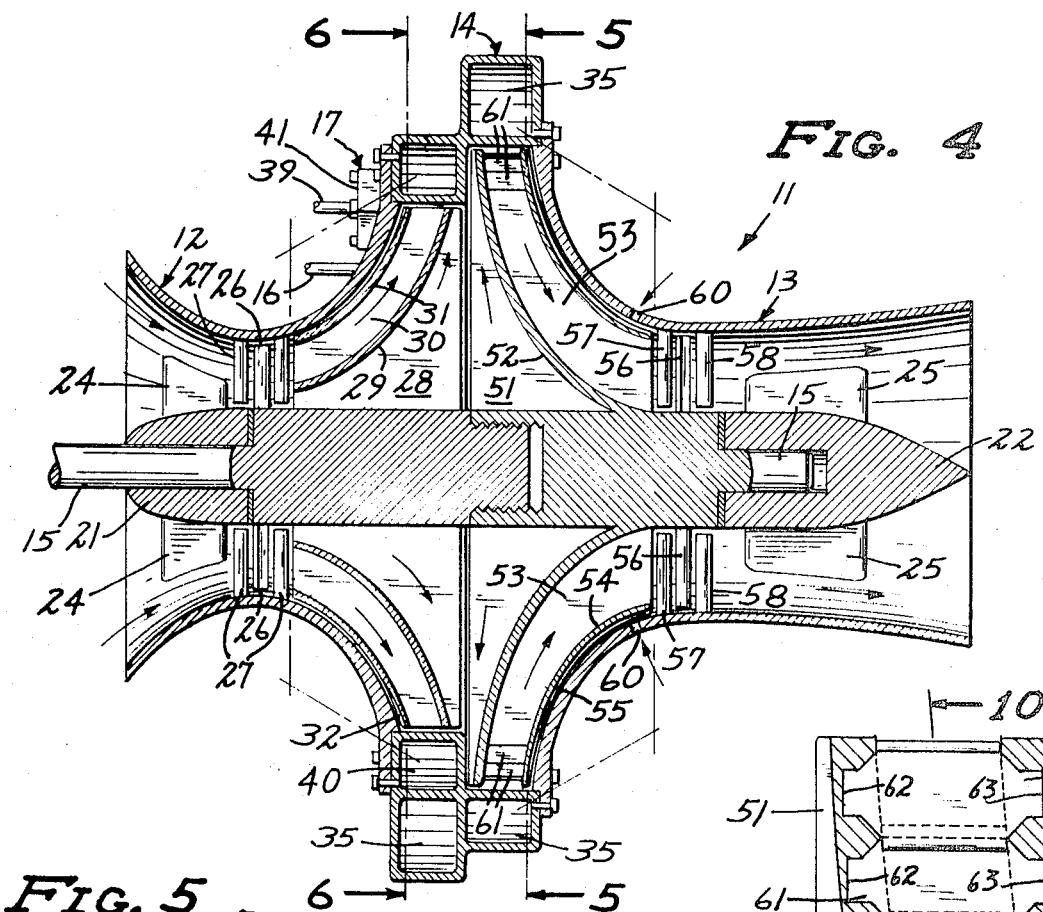
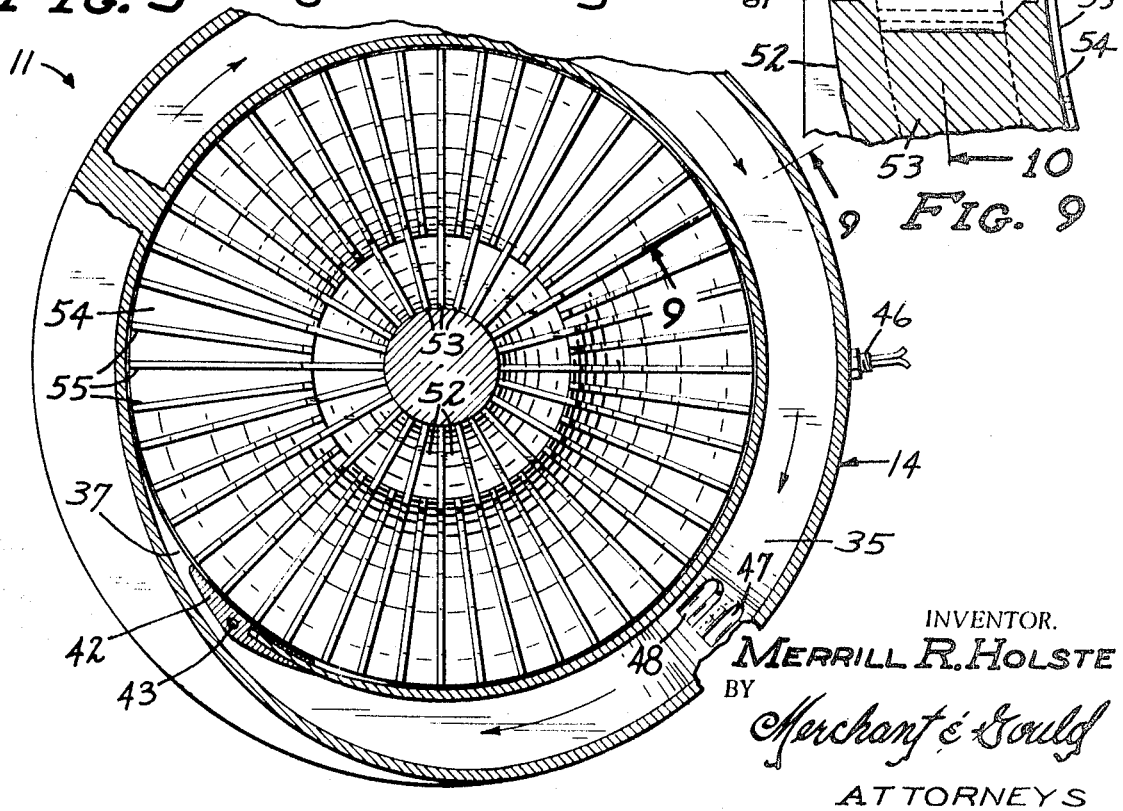
INVENTOR.
MERRILL R. HOLSTE
BY
Merchant & Gould
ATTORNEYS Dec. 14, 1971   M. R. HOLSTE   3,626,694
CENTRIFUGAL FLOW GAS TURBINE
Filed May 18, 1970   4 Sheets-Sheet 3
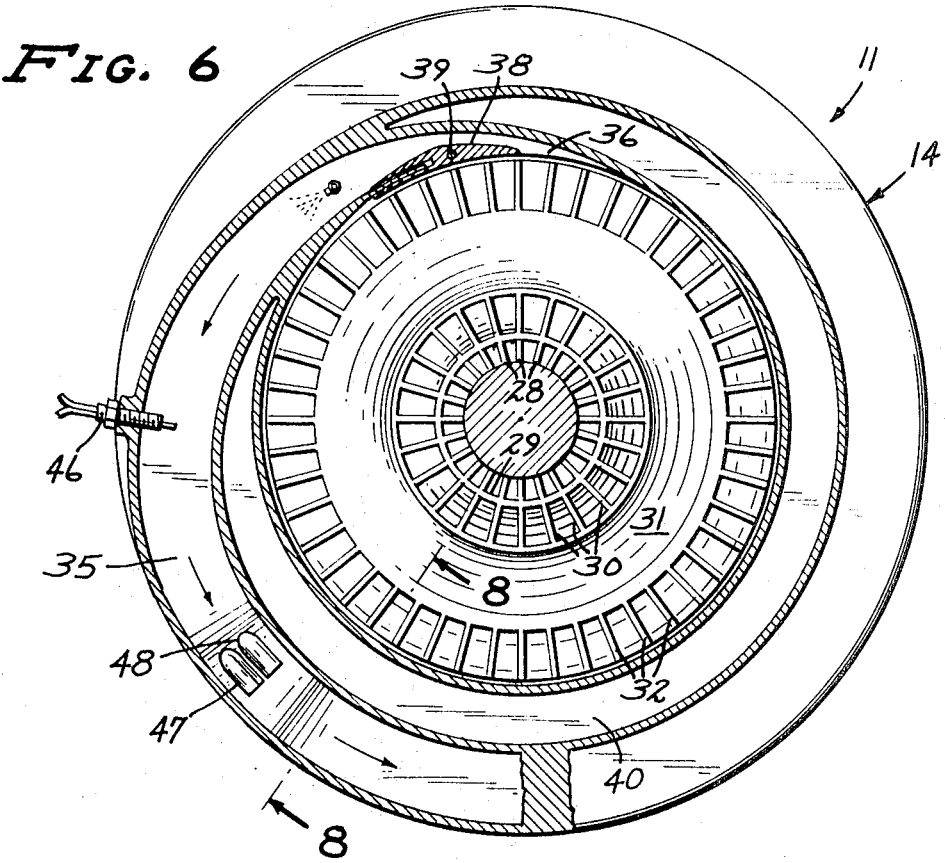
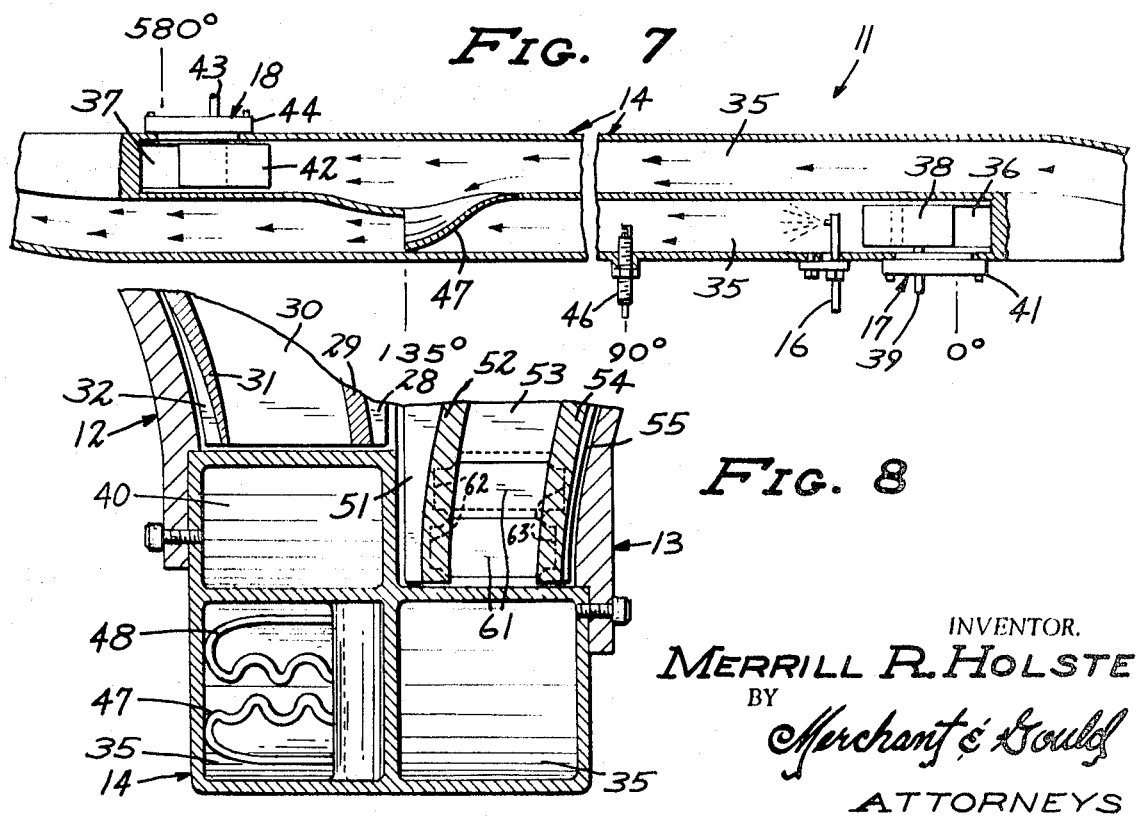
INVENTOR.
MERRILL R. HOLSTE
BY
Merchant & Gould
ATTORNEYS

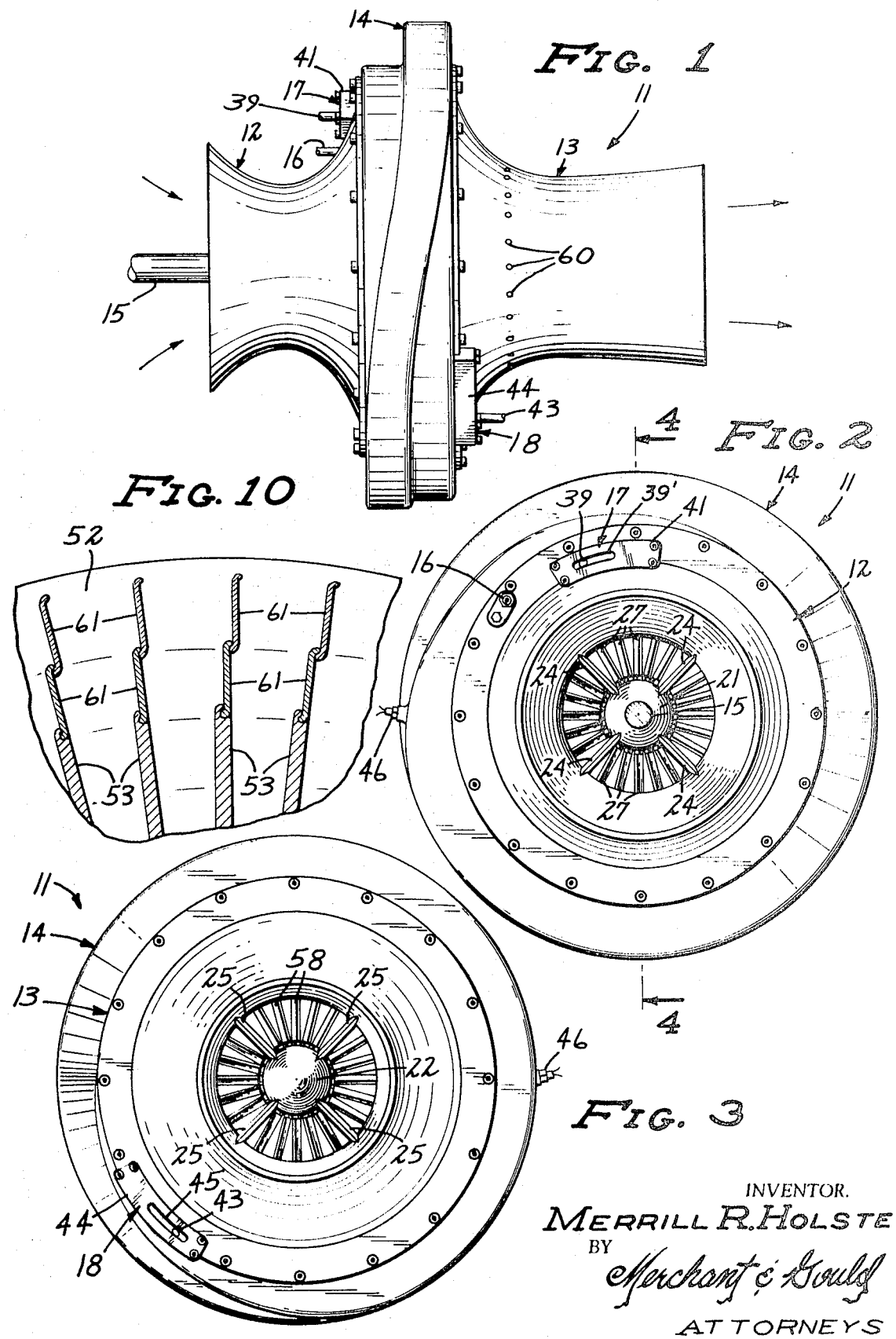

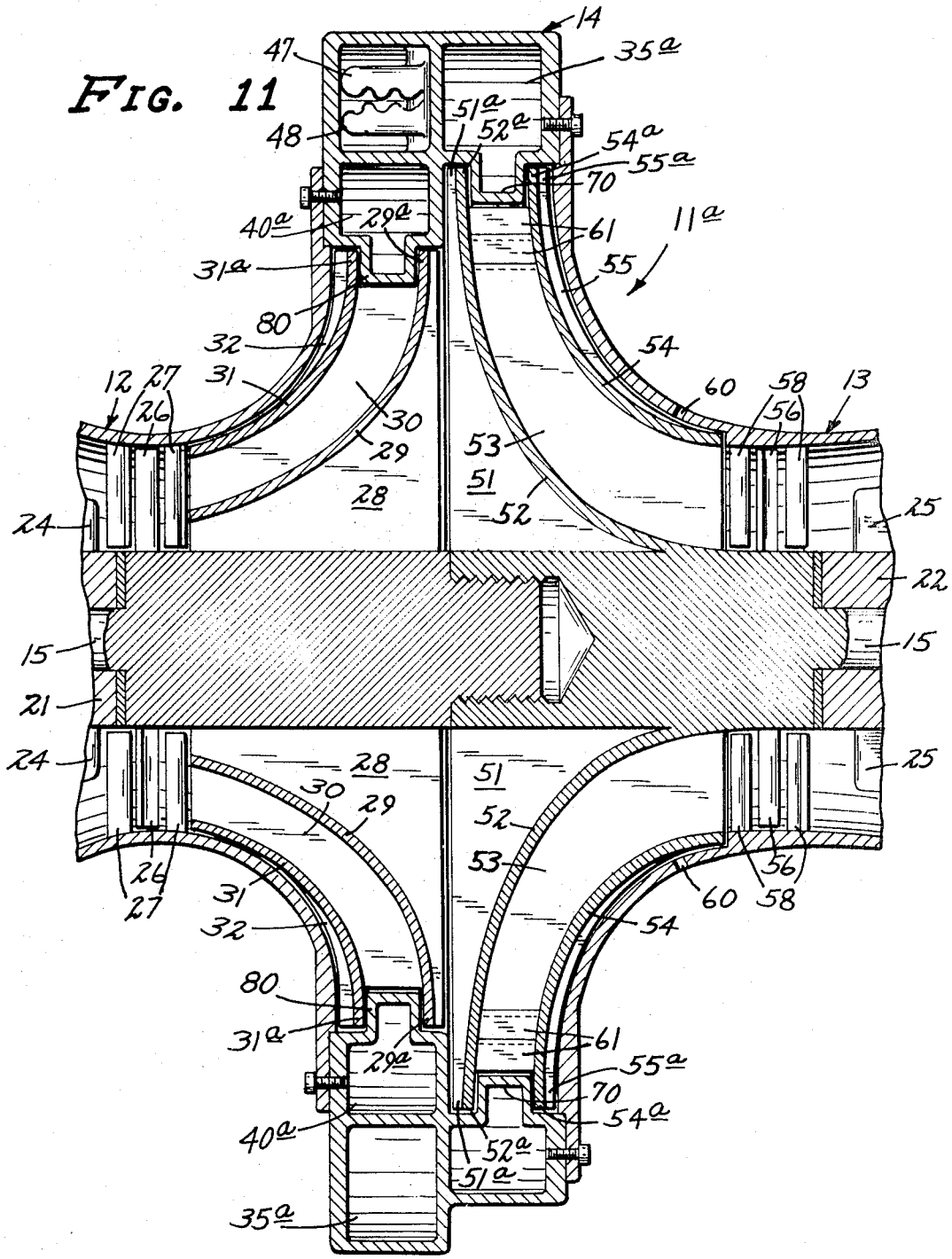

United States Patent Office 3,626,694
Patented Dec. 14, 1971

3,626,694
CENTRIFUGAL FLOW GAS TURBINE
Merrill R. Holste, 2228 Saint Stephen St.,
St. Paul, Minn. 55113
Filed May 18, 1970, Ser. No. 37,952
Int. Cl. F02c *3/08, 3/14, 7/28*
U.S. Cl. 60—39.69          24 Claims

ABSTRACT OF THE DISCLOSURE

A gas turbine having a centrifugal compressor and an inward flow power turbine is disclosed which includes a combustion chamber that spirally encircles the turbine, defining a straight-through passage for the fuel-air mixture as it flows therethrough during ignition, combustion and exhaust. The chamber preserves continuous, laminar flow and thereby increases engine power and efficiency. Also disclosed is a flame holder for the combustion chamber which intermixes ignited gases with the cooler, unignited gas mixture to better maintain ignition in the chamber. A centrifugal air seal is used to prevent blow-by or leakage of compression gases and combustion gases between the engine housing and the compression turbine and between the power turbine and its housing.

The invention is related to centrifugal flow gas turbine engines, and is specifically directed to such an engine having an improved combustion chamber.

Gas turbine engines employing centrifugal compressors are known to be less efficient in larger sizes than those using axial compressors, primarily due to the discontinuous flow of air between the engine inlet and exhaust. The discontinuity of flow between the three main parts of the centrifugal turbine—(1) the centrifugal velocity generated in the compressor which is (2) transformed in the combustion chamber into an essentially static pressure containing turbulent vortices and (3) once again transformed into centrifugal velocity in the power generating portion of the centrifugal turbine—is a process that introduces turbulence losses. Since power of a gas turbine is a function of the volume of air passing therethrough, it is my belief that these low discontinuities preclude the centrifugal flow compressor engine from realizing its full power potential.

To increase engine power and efficiency, I propose in combination with a centrifugal compressor and a radial inflow power turbine a continuous flow combustion chamber that spirally encircles the engine between the compressor outlet and the power turbine inlet. Such a combustion chamber preserves the laminar flow of gases passing therethrough, thereby reducing energy losses attributed to turbulence, reducing the eddying effect of burning gases which causes unevenness of burning, vibration and noise, making possible the use of fuels of lower volatility in which the flame front progresses more slowly and reducing the necessary volume of the combustion chamber.

I also propose within the combustion chamber a novel flame holder which interleaves burning gases with the incoming fuel air mixture in non-turbulent layers, thus serving to spread the flame front in a non-turbulent manner throughout the fuel mixture and maintaining ignition in the combustion chamber with a minimum of turbulence losses.

Another feature of my invention is a centrifugal gas seal which utilizes compressed air to prevent blow-by or leakage of ignited gases between the rotating parts of the turbine and their adjacent engine housings.

At the periphery of the power turbine, I employ transverse blades supported at their ends and designed so that tensional strains normally experienced by single-unit blades, when supported at their axial roots, are divided into several separate magnitudes, one portion for the section of blade rooted at the axis and another portion for each transverse blade. The tensional strain falling within each transverse blade can be divided further, through design of the blade, into a compressional and a tensional component. The single tensional strain normally falling upon any given segment of a turbine blade is thus divided into several components in my segmented blade. My turbine blades are therefore enabled to withstand either higher rotary velocities or higher temperatures or both because of the division of stresses and because materials composing turbine blades withstand compression better than tension under conditions of operation. This construction substantially aids the highly heated blade materials to resist deformation and minimizes the tendency for the materials to creep and flow.

BRIEF DESCRIPTION OF THE DRAWINGS

FIG. 1 is a side elevational view of a centrifugal flow turbine engine employing the inventive principle;

FIG. 2 is a front end elevational view of the centrifugal flow turbine engine;

FIG. 3 is a rear end elevational view of the turbine engine;

FIG. 4 is a cross-sectional view of the turbine engine taken along the line 4—4 of FIG. 2, on an enlarged scale;

FIG. 5 is a cross-sectional view of the turbine engine taken generally along the irregular line 5—5 of FIG. 4, portions thereof removed;

FIG. 6 is a cross-sectional view of the turbine engine taken generally along the irregular line 6—6 of FIG. 4, portions thereof removed;

FIG. 7 is a generated diagrammatic view of the combustion chamber of the turbine engine;

FIG. 8 is an enlarged sectional view of the combustion chamber taken along the line 8—8 of FIG. 6;

FIG. 9 is an enlarged sectional view of the power turbine blades taken along line 9—9 of FIG. 5;

FIG. 10 is a cross-sectional view of the power turbine blades taken along line 10—10 of FIG. 9; and FIG. 11 is an enlarged sectional view similar to FIG. 4 of a modified turbine engine.

DESCRIPTION OF THE PREFERRED EMBODIMENTS

With reference to FIG. 1, a centrifugal flow gas turbine engine represented generally by the numeral 11 consists of a compressor housing 12, a power turbine housing 13 and a combustion chamber housing 14 which spirally encircles the engine. Engine 11 also includes a rotating shaft 15, a fuel-injecting apparatus 16 and throttling means 17 and 18, all of which are discussed in further detail below.

Referring additionally to FIGS. 2, 3 and 4, rotating shaft 15 is shown to be journaled in a pair of supports 21, 22 which are respectively carried by the compressor housing 12 and power turbine housing 13 by radially disposed supports 24 and 25.

The compressor for engine 11 consists of a multiple-stage axial flow portion and a centrifugal flow portion arranged in sequence. The multiple stages of the axial compressor consist of rotating blades 26, which are radially mounted on rotating shaft 15, and stationary blades 27 which are disposed radially inwardly from compressor housing 12.

Referring additionally to FIG. 6, the centrifugal flow portion of the compressor consists of a first set of radially disposed blades 28 connected to rotating shaft 15, an axisymmetrically-shaped wall 29 overlying and connected to the outer edges of blades 28, a second set of blades 30 the inner edges of which are mounted on wall 29, a second axisymmetrically-shaped wall 31 mounted on the outer edges of blades 30 and a third set of blades 32 the inner edges of which are mounted or cut into the outer periphery of wall 31. The output of the second set of blades 30 is mixed with fuel for subsequent ignition and combustion, while the outputs of the first set 28 and second set 32 of blades are used for sealing purposes as will be discussed below.

FIGS. 4, 5 and 6 disclose a spirally-shaped combustion chamber 35 defined by housing 14, which has an inlet 36 (FIG. 6) directly communicating with the second set of turbine blades 30, and an outlet 37 (FIG. 5) which is at least 360 degrees and preferably 580 degrees or more downstream of inlet 36. The degree of opening of inlet 36 is governed by throttling means 17, which consists of a slidable throttle member 38 having a linkage rod 39 which protrudes through an arcuate gap 39' formed in a bracket plate 41, the plate 41 being mounted on compressor housing 12 (FIG. 2). Similarly, the throttling means 18 for outlet 37 consists of a throttle member 42, a linkage rod 43 and a bracket plate 44 having an arcuate gap 45 (FIG. 3).

Fuel injector or nozzle 16 is located immediately downstream of inlet 36 as seen in FIG. 6, and an igniter plug 46 is disposed approximately 90 degrees downstream of inlet 36 or at some location where the fuel is sufficiently vaporized and mixed with air to make ignition easily accomplished.

Referring additionally to FIG. 7, which is a generated view of combustion chamber 35, it can be seen that chamber 35 spirally encircles the turbine engine to the point that the upstream portion is side-by-side with the downstream portion. Providing communication between these upstream and downstream portions are a pair of louvers 47, 48 which are disposed a suitable distance downstream from inlet 36, preferably about 135 degrees as shown. Louvers 47, 48 are shaped so that the downstream portion of combustion chamber 35 widens, thereby reducing the velocity of ignited gases and increasing their dynamic pressure at that point. A restriction is created in the upstream portion by louvers 47, 48, thereby increasing the gas velocity and reducing the dynamic fluid pressure. Thus a pressure differential is created across louvers 47, 48 and a portion of the downstream gas flow is introduced into the upstream gases in an essentially laminar, non-turbulent manner. The effect of this is to create a flame holder within combustion chamber 35 by passing hot previously-combusted downstream gases into the upstream air-fuel mixture, which is cooler and unignited. This intermixing or interleaving of hot gases at a temperature above the flash point of the incoming gas mixture serves to ignite the incoming air-fuel mixture and to maintain a self-maintaining circle of flame in combustion chamber 35. FIG. 8 shows the trailing edges of louvers 47, 48 to be formed with staggered undulations in order to further cause a double interleaving of the hot combusted gases with the air-fuel mixture, thus facilitating and accelerating the progression of the flame front through the air-fuel mixture.

When the temperature of the combustion chamber reaches operating levels, the igniter plug may be turned off as the hot gases passing through the second portion of the combustion chamber will be well above the ignition point of the fuel-air mixture and will serve to maintain ignition by passing into the fuel-air mixture through louver structure 47, 48 as explained in the preceding paragraph.

FIG. 6 indicates that the cross-sectional area of combustion chamber 35 increases downstream of inlet 36. In accordance with Bernoulli's law, this enlarged cross-sectional area reduces the velocity of air entering chamber 35 from the centrifugal compressor, which increases the dynamic pressure to effect proper combustion. The centrifugal turbine has a power turbine section with a greater radius than the compressor. Therefore, as the encircling combustion chamber 35 begins to encircle the compressor it is given a greater radius than the compressor soon after the entrance port 36. This results in a dead space, or unused space between the compressor and the combustion chamber designated as 40 in FIG. 6. The inward flow power turbine is disclosed in FIGS. 4 and 5, and resembles the centrifugal compressor structure. It consists of a plurality of radially disposed blades 51 having edges affixed to rotating shaft 15, the blades 51 corresponding to blades 28 of the centrifugal compressor. Similarly, the power turbine includes an axisymmetric wall 52 connecting the outer edges of blades 51, a plurality of blades 53 having inner edges affixed to wall 52 and a wall 54 joining the outer edges of blades 53. Disposed in the gap lying between wall 54 and power turbine housing 13 are a plurality of blades 55 the purpose of which will be described in detail below. A plurality of holes 60 encircle housing 13 and communicate with blades 55 and the gap formed between wall 54 and housing 13.

The power turbine may also include a multi-stage axial portion consisting of radially disposed blades 56 connected to rotating shaft 15, and two sets of inwardly disposed blades 57, 58, which are affixed to housing 13.

Referring additionally to FIGS. 9 and 10, it can be seen that blades 53 do not extend solidly to the outer periphery of the power turbine, but instead terminate in a plurality of transverse blades 61, which are received by aligned slots 62, 63 formed in walls 52 and 54, respectively. Slots 62 and 63 are slightly larger than the ends of transverse blades 61, thus allowing them to expand and contract according to the temperature changes they experience between non-operating and operating conditions. During operation, the centrifugal forces exerted on blades 61 cause their outer (top) edges to bear against the top of slots 62 and 63. This in turn gives rise to tensional forces on the outer leading edge of each of the blades 16, while the inner edge is subjected to compressional force. This minimizes the tendency of the material from which blades 61 are formed to creep, flow or become deformed under the extremely hot conditions of operation. As seen FIG. 10, the blades 61 are overlapped or feathered in order to keep combusted gases flowing non-turbulently toward the engine exhaust.

FIG. 4 shows the diameter of combustion chamber 35 to increase as it progressively spirals from the centrifugal compressor to the inward flow power turbine, thus requiring the power turbine diameter to be greater than that of the centrifugal compressor. This is done in order to compensate for the increased velocity of combusted gases, and the power turbine diameter is designed so that the tips of the power turbine blades move at approximately the same velocity as the gases entering the power turbine from the combustion chamber. The gases leaving the combustion chamber at a velocity much increased over the compressor velocity therefore give up their increased energy to the rotating power turbine blades in an optimum manner during flow from the periphery to the central exhaust.

In operation, rotation of shaft 15 causes air entering the engine to be compressed first by the axial portion of the compressor, and subsequently by the centrifugal blades 28, 30 and 32. That portion of compressed air passing through blades 30 enters combustion chamber 35 directly through inlet 36. The fuel brought into combustion chamber 35 through injector 16 is mixed into the compressed air and is thereafter ignited by plug 46. Pressure within chamber 35 builds up by virtue of ignition and combustion coupled with the increasing cross-sectional area, whereupon the expanding gases are released through outlet 37 to impart force on transverse blades 61, blades 53 and ultimately blades 56, 57 and 58. These exlposive forces cause the power turbine portion of engine 11 to revolve and generate rotational energy that can be utilized in a desired manner.

Louvers 47 and 48 communicate the ignited fuel mixture from a point upstream from outlet 37 to a point downstream of the ignition plug 46. Thus, the flame not only progresses spirally to outlet 37, but also doubles back to ignite the incoming, cooler fuel mixture and maintain continuous ignition and combustion in chamber 35.

The exceedingly high forces resulting from compression, ignition and combustion in chamber 35 must be fully contained and channeled into the power turbine blades, in order to achieve highest engine performance. To this end, blades 28 and 51 (which are located in a common chamber) centrifugally compress air and direct it outwardly in a peripheral direction. Blades 28 and 51, working in the inner chamber, work in conjunction with blades 32 and 55 which are located on the outside axisymmetric walls 31 and 55 of the compressor and power turbine respectively. The four sets of blades 32, 28, 51, 55 work together to circulate air to produce centrifugal pressures that contain the internal compressed gases, thus channeling compressed air into the combustion chamber and forcing the combusted gas to leave the combustion chamber 35 in the proper channel past the power turbine blades 61 and 53 located between walls 52 and 54. Blades 32, 28 and 51 all receive intake air from the engine inlet, while blades 55 receive ambient air through holes 60. Thus, an optimum amount of energy generated by the combusted gases in chamber 35 is channeled through blades 61 and 53 to achieve high engine performance.

FIG. 11 discloses a slightly modified turbine engine 11a. Engine 11a is substantially the same as engine 11, and like numerals are used to represent identical parts.

Engine 11a has a combustion chamber 35a which is formed with a projetin ortion .ranserse bladeTgo33m formed with a projecting portion 70. Transverse blades 61 terminate at the inner peripheral face of projecting portion 70, but the outer peripheral edges of walls 52 and 54 (marked 52a and 54a, respectively) extend beyond and are disposed adjacent the side walls of projecting portion 70.

The air which is forced centrifugally outward by blades 51 and 55 attains a higher centrifugal pressure because blades 51a and 55a have a greater radial distance from the axis of rotation than the outer transverse blades 61. Thus the air circulated by these blades has a greater centrifugal pressure than that generated by transverse blades 61. This greater pressure maintains a positive retaining force that keeps the combusted gas that flows out through the combustion chamber outlet 37 (FIG. 5) channel properly between walls 52 and 54. Since the combusted gas must flow against the centrifugal pressures generated by blades 61 and 53, it must release its energy against (do work upon) blades 61 and 53.

The positive pressure generated by blades 51a and 55a force air outward from the axis of rotation to flow around and encircle the outer peripheral edges of 52a and 54a. The inner faces of walls 52a and 54a are machined smooth and permit the encircling flow of air to move freely toward the center and to mingle with and to cool the combusted gases flowing out of the combustion chamber 35a through the combination chamber outlet port 37 (FIG. 5) past the transverse blades 61 and blades 53 toward the exhaust outlet.

The encircling flow of cool air performs three important duties: (1) cools the combusted gases flowing past transverse blades 61, thereby reducing heat stress on 61 and (2) cools projecting portions of axisymmetric walls 52a and 54a, maintaining the tensile strength of these walls and (3) cools the outer blades 51 and 55 which are labeled 51a and 55a in FIG. 11. Walls 52a and 54a thus retain their tensile strength so that they form a ring of strength about the intensely heated portions of the power turbine's axisymmetric walls. This band of tensile strength resists and contains the bursting power of the centrifugal force. Blades 51a and 55a, being cooled by the encircling flow of air retain their tensile strength, thus support the outer peripheries 52a and 54a against rupture by centrifugal forces as if they were spokes of a wheel tying the periphery to the central axis. Similarly, dead chamber 40a has a projecting portion 80, and the outer peripheral edges of walls 29 and 31 extend outwardly, as shown at 29a and 31a, respectively. This configuration enables the air forced centrifugally outward by blades 28 and 32 to attain a higher centrifugal pressure than provided by blades 30 thus preventing leakage of air being compressed by blades 30.

What is claimed is:

1. A centrifugal flow gas turbine, comprising:
   (a) an elongated housing having an air inlet and an exhaust;
   (b) a centrifugal compressor mounted for rotation in the housing, the compressor having an inlet communicating with the housing inlet and an outlet disposed at its periphery;
   (c) an inward radial flow power turbine mounted in the housing for rotation with the compressor, the power turbine having an inlet disposed at its periphery and an outlet communicating with the housing exhaust;
   (d) a spirally-shaped combustion chamber having an air inlet communicating with the compressor outlet, an outlet communicating with the power turbine inlet, a fuel inlet and means for igniting the fuel and its mixture in the combustion chamber;
   (e) and control means for modulating the amount of fuel entering the combustion chamber and for adjustably restricting the combustion chamber inlet and outlet.

2. The gas turbine as defined in claim 1, wherein the diameter of the power turbine is chosen so that its peripheral velocity essentially corresponds to the velocity of the combusted fuel and air mixture.

3. The gas turbine as defined by claim 1, wherein the combustion chamber outlet is circumferentially disposed at least 360 degrees downstream from the combustion chamber inlet.

4. The gas turbine as defined by claim 1, and further comprising passage means for communicating upstream and downstream portions of the combustion chamber to permit intermixture of ignited and unignited fuel and air mixtures.

5. The gas turbine as defined by claim 1, wherein the cross-sectional area of the combustion chamber increases downstream of the chamber inlet.

6. The gas turbine as defined by claim 1, wherein the combustion chamber encircles the compressor and power turbine.

7. The gas turbine as defined by claim 1, wherein the fuel igniting means is intermittently firable.

8. The gas turbine as defined by claim 1, wherein the centrifugal compressor and the power turbine are mounted on a rotating shaft journaled in first and second supports carried by the housing.

9. The gas turbine as defined by claim 8, wherein the power turbine comprises:
   (a) a first axisymmetrically tapered wall affixed to the rotating shaft;
   (b) a second axisymmetrically tapered wall spaced from the first wall;
   (c) a plurality of combusted gas-receiving blades, the blades being radially disposed and each having
      (i) a first edge conforming in shape to the first wall and affixed to its outer side;
      (ii) and a second edge conforming in shape to the second wall and affixed to its inner side;
   (d) the first wall, the second wall and the blades defining a flow path between the combustion chamber outlet and the housing exhaust.

10. The gas turbine as defined by claim 9, wherein:
(a) the downstream portion of the combustion chamber includes a radially inwardly projecting portion disposed adjacent the outer edges of the combusted gas-receiving blades;
(b) and the outer peripheral edges of the first and second axisymmetrically tapered walls extend beyond the outer edges of the combusted gas-receiving blades adjacent opposite sides of said projecting portion of the combustion chamber.

11. The gas turbine as defined by claim 10, wherein the inwardly projecting portion of the combustion chamber is rectangular in cross-section.

12. The gas turbine as defined by claim 1, wherein:
(a) a space is defined by the power turbine and the housing, the space extending between a point adjacent the combustion chamber outlet and the housing exhaust;
(b) and the power turbine further comprises means for effecting inward radial air flow in said space in a direction toward said adjacent point.

13. The gas turbine as defined by claim 12, wherein the means for effecting centrifugal air flow in the space comprises a plurality of radially disposed blades affixed to the power turbine and disposed in the space.

14. The gas turbine as defined by claim 1, wherein:
(a) a space is defined by the centrifugal compressor and the housing, the space extending between the housing inlet and a point adjacent the combustion chamber inlet;
(b) and the centrifugal compressor further comprises means for effecting centrifugal air flow in said space in a direction toward said adjacent point.

15. The gas turbine as defined by claim 14, wherein the means for effecting centrifugal air flow in the space comprises a plurality of radially disposed blades affixed to the centrifugal compressor and disposed in the space.

16. A centrifugal flow gas turbine comprising:
(a) an elongated housing having an air inlet and an exhaust;
(b) a centrifugal compressor mounted for rotation in the housing, the compressor having an inlet communicating with the housing inlet and an outlet disposed at its periphery;
(c) an inward radial flow power turbine mounted in the housing for rotation with the compressor, the power turbine having an inlet disposed at its periphery and an outlet communicating with the housing exhaust;
(d) a spirally shaped combustion chamber encircling the compressor and power turbine so that upstream and downstream portions thereof are disposed side-by-side, the combustion chamber having an air inlet communicating with the compressor outlet, an outlet communicating with the power turbine inlet, a fuel inlet and means for igniting the fuel and air mixture in the combustion chamber;
(e) and passage means for communicating upstream and downstream portions of the combustion chamber to permit intermixture of ignited and unignited fuel and air mixtures, the passage means comprising louver means constructed and arranged to enlarge the downstream portion and restrict the upstream portion.

17. The gas turbine as defined by claim 16, wherein the trailing edges of the louver means are undulated.

18. A centrifugal flow gas turbine, comprising:
(1) an elongated housing having an air inlet and an exhaust;
(2) a centrifugal compressor and a power turbine mounted on a rotating shaft journaled in first and second supports carried by the housing;
(3) the compressor having an inlet communicating with the housing inlet and an outlet disposed at its periphery;
(4) the power turbine having an inlet disposed at its periphery and an outlet communicating with the housing exhaust, and comprising
(a) a first axisymmetrically tapered wall affixed to the rotating shaft;
(b) a second axisymmetrically tapered wall spaced from the first wall;
(c) a plurality of combusted gas-receiving blades, the blades being radially disposed and each having
(i) a first edge conforming in shape to the first wall and affixed to its outer side;
(ii) and a second edge conforming in shape to the second wall and affixed to its inner side;
(d) the first wall, the second wall and the blades defining a flow path between the combustion chamber outlet and the housing exhaust;
(e) and a second set of blades each having a first edge conforming to the shape of the first wall and affixed to its inner side, and a second edge extending parallel to the rotating shaft and affixed thereto;
(5) and a spirally shaped combustion chamber encircling the compressor and power turbine, the combustion chamber having an air inlet communicating with the compressor outlet, an outlet communicating with the power turbine inlet, a fuel inlet and means for igniting the fuel and air mixture in the combustion chamber.

19. A centrifugal flow gas turbine comprising:
(1) an elongated housing having an air inlet and an exhaust;
(2) a centrifugal compressor and a power turbine mounted on a rotating shaft journaled in first and second supports carried by the housing;
(3) the power turbine having an inlet disposed at its periphery and an outlet communicating with the housing exhaust;
(4) the centrifugal compressor having an inlet communicating with the housing inlet and an outlet disposed at its periphery, and comprising
(a) first and second spaced axisymmetrically tapered walls;
(b) a first set of air-receiving blades radially disposed on the rotating shaft, each blade having a first edge extending parallel to the rotating shaft and affixed thereto, and a second edge conforming to the shape of the first wall and affixed to its inner side;
(c) and a second set of air-receiving blades having first and second edges conforming to the shape of the first and second walls, respectively, the first edge being affixed to the outer side of the first wall and the second edge being affixed to the inner side of the second wall;
(d) the first and second walls and the second set of blades defining an air flow path between the housing inlet and the combustion chamber inlet;
(e) and the first wall, the rotating shaft and the first set of blades defining an air flow path from the housing inlet to a point adjacent the combustion chamber inlet.

20. A centrifugal flow gas turbine, comprising:
(1) an elongated housing having an air inlet and an exhaust;
(2) a centrifugal compressor and a power turbine mounted on a rotating shaft journaled in first and second supports carried by the housing;
(3) the compressor having an inlet communicating with the housing inlet and an outlet disposed at its periphery;
(4) the power turbine having an inlet disposed at its periphery and an outlet communicating with the housing exhaust, and comprising (a) a first axisymmetrically tapered wall affixed to the rotating shaft;

(b) a second axisymmetrically tapered wall spaced from the first wall;

(c) a plurality of combusted gas-receiving blades, the blades being radially disposed and each having
  (i) a first edge conforming in shape to the first wall and affixed to its outer side;
  (ii) and a second edge conforming in shape to the second wall and affixed to its inner side;

(d) the first wall, the second wall and the blades defining a flow path between the combustion chamber outlet and the housing exhaust;

(e) each of the combusted gas-receiving blades terminating at the end nearest the combustion chamber outlet in a plurality of transverse blades, each transverse blade having first and second ends received by aligned slots formed in the outer side of the first wall and the inner side of the second wall, respectively;

(5) and a spirally shaped combustion chamber encircling the compressor and power turbine, the combustion chamber having an air inlet communicating with the compressor outlet, an outlet communicating with the power turbine inlet, a fuel inlet and means for igniting the fuel and air mixture in the combustion chamber.

21. The gas turbine as defined by claim 20, wherein the aligned slots are slightly larger than the ends of the transverse blades.

22. A centrifugal flow gas turbine comprising:

(a) an elongated housing having an air inlet and an exhaust;

(b) a centrifugal compressor mounted for rotation in the housing, the compressor having an inlet communicating with the housing inlet an an outlet disposed at its periphery;

(c) an inward radial flow power turbie comprising first and second sets of radially disposed blades mounted in the housing for rotation with the compressor, the power turbine having an inlet disposed at its periphery and an outlet communicating with the housing exhaust;

(d) a spirally shaped combustion chamber having an air inlet communicating with the compressor outlet, an outlet communicating with the power turbine inlet, a fuel inlet and means for igniting the fuel and air mixture in the combustion chamber;

(e) the first set of blades constructed and arranged to receive combusted gas from the combustion chamber outlet;

(f) a space defined by the power turbine and housing, the space extending between a point adjacent the combustion chamber outlet and the housing exhaust;

(g) and the second set of blades disposed in the space and extending radially outward further than the first set of blades to effect radial air flow in said space in a direction toward said adjacent point.

23. A centrifugal flow gas turbine, comprising:

(a) an elongated housing having an air inlet and an exhaust;

(b) a centrifugal compressor mounted for rotation in the housing, the compressor having an inlet communicating with the housing inlet and an outlet disposed at its periphery;

(c) an inward radial flow power turbine mounted in the housing for rotation with the compressor, the power turbine having an inlet disposed at is periphery and an outlet communicating with the housing exhaust;

(d) and a spirally-shaped combustion chamber encircling the compressor and power turbine, the combustion chamber having an air inlet communicating with the compressor outlet, and outlet communicating with the power turbine inlet, a fuel inlet and means for igniting the fuel and air mixture in the combustion chamber;

(e) a space being defined by the power turbine and the housing, the space extending between a point adjacent the combustion chamber outlet and the housing exhaust;

(f) means for effecting radial air flow in said space in a direction toward said adjacent point;

(g) and passage means disposed in the housing proximate the housing exhaust for establishing communication between the space and the ambient atmosphere.

24. The gas turbine as defined by claim 23, wherein the passage means comprises a plurality of openings circumferentially disposed in the housing.

References Cited
UNITED STATES PATENTS

| | | | |
|---|---|---|---|
| 2,663,141 | 12/1953 | Hage | 60—39.16 |
| 3,157,793 | 11/1964 | Adkins | 415—143 X |
| 3,309,866 | 3/1967 | Kydd | 60—39.36 X |
| 2,127,865 | 8/1938 | Goddard | 415—109 |
| 1,133,058 | 3/1915 | Paturel et al. | 60—39.36 |
| 3,548,565 | 12/1970 | Toesca | 60—39.36 UX |
| 3,365,892 | 1/1968 | Derderian | 60—39.16 X |

ALLAN D. HERRMANN, Primary Examiner

U.S. Cl. X.R.

60—39.36, 39.52; 415—109, 143